United States Patent [19]

Hell et al.

[11] 4,313,655
[45] Feb. 2, 1982

[54] FOCUSSING SYSTEM WITH AUTOMATIC CONTROL OF EMITTED RADIANT POWER

[75] Inventors: August Hell, Feldkirchen; Kurt Borowski, Aschheim; Istvan Cocron; Theodor Huber, both of Munich, all of Fed. Rep. of Germany

[73] Assignee: Agfa-Gevaert AG, Leverkusen, Fed. Rep. of Germany

[21] Appl. No.: 28,493

[22] Filed: Apr. 9, 1979

[30] Foreign Application Priority Data

Apr. 7, 1978 [DE] Fed. Rep. of Germany ....... 2815151

[51] Int. Cl.³ .......................... G03B 3/00; G03B 3/10
[52] U.S. Cl. .................................... 354/25; 354/195; 250/355; 250/205
[58] Field of Search ................. 354/25, 163, 195, 197, 354/25 A; 250/355, 205; 356/4, 5; 352/140; 355/56

[56] References Cited

U.S. PATENT DOCUMENTS

| 3,815,994 | 6/1974 | Peckham | 250/205 |
| 4,150,888 | 4/1979 | Filipovich | 354/25 |
| 4,178,087 | 12/1979 | Shenk | 354/195 |

*Primary Examiner*—Joseph W. Hartary
*Assistant Examiner*—S. D. Schreyer

*Attorney, Agent, or Firm*—Michael J. Striker

[57] ABSTRACT

A focussing system of the type which emits radiation from the camera towards the subject, with the radiation reflected from the subject being incident upon a receiving transducer generating an electrical signal from which focus-control information is derived. The emitted radiant-power level is automatically controlled in dependence upon camera-to-subject distance, preferably in dependence upon the power level of the reflected-back radiation incident upon the receiving transducer, even when the focus-control information required for primary system operation is independent of such power level. This makes possible various important improvements, including: automatic lowering of the emitted-power level in close-up contexts, especially where a danger of eye damage might exist; more generally, automatic matching of emitted-power level to the needs of the signal-processing circuitry, permitting signal-processing stages of narrower operative range to be employed on account of the narrower variations in power level of the signal produced by the receiving transducer; and lowered power consumption. Preferably, when a focussing operation is initiated, the emitted power level is initially low or zero and is progressively increased to an automatically selected value without overshoot.

11 Claims, 5 Drawing Figures

FOCUSSING SYSTEM WITH AUTOMATIC CONTROL OF EMITTED RADIANT POWER

BACKGROUND OF THE INVENTION

The present invention concerns focussing systems for still or motion-picture photographic cameras of the type employed to automatically adjust the camera's state of focus, or else to indicate to the user the direction in which the state of focus is to be adjusted by him, in dependence upon an automatically performed state-of-focus evaluation or subject-distance measurement involving the emission of radiant energy from the camera to the subject, its reflection back towards the camera, and its reception at the camera by a transducer system operative for generating an electrical signal from which focus control information is derived.

SUMMARY OF THE INVENTION

It is one object of the invention to prevent the possibility of eye damage or discomfort to a human subject towards whom the focussing system is aimed, especially when the radiation employed by the system is in the form of electromagnetic radiation. This problem is particularly serious, for example, in the case of close-up or portrait photography when infrared radiation is employed, because such radiation is furthermore not visible to the human subject.

It is a further object of the invention, more generally, to provide a focussing system in which the power required for emitting the measuring radiation is not consumed wastefully, and in which the radiation-based signal-processing operations performed do not require signal-processing circuitry with excessively large operative ranges, nor conversely in which the signal-processing circuitry or components of it tend to become under- or overdriven relative to their operative ranges, even when the range of camera-to-subject distances within which the focussing system is to operate is large.

In accordance with the present invention, these objects and others are achieved by providing a focussing system in which the level of emitted radiant power is automatically controlled in dependence upon the true camera-to-subject distance.

In this way, especially when the emitted radiation is infrared, the system can automatically cut down the emitted radiant-power level in close-up contexts. This prevents the possibility of eye damage or discomfort, without compromising the operativeness of the system, because in close-up contexts a lowered power level avoiding eye damage can readily be kept high enough for detection by the receiving transducer of the focussing system.

More generally than an emitted-power cut-down in close-up situations, the system can be designed such that the emitted power level is automatically varied in direct relationship to the true camera-to-subject distance, preferably by negative-feedback action. In this way, besides considerations of eye safety and comfort, the emitted power level is automatically matched to the needs of the signal-processing circuitry employed. For subjects closer to the camera, lower emitted power can be employed, and when subjects farther and farther from the camera are involved, the emitted power can be made increasingly high. In addition to inherent energy savings, this tends to better utilize the operative ranges of whatever signal-processing stages are employed in the system, because the intensity of the radiation incident upon the system's receiving transducer varies within a much narrower range than conventionally, minimizing the probability that signal-processing stages will be under- or overdriven, or conversely permitting the use of signal-processing stages having narrower operative ranges than would otherwise be possible.

According to a particularly advantageous further concept of the invention, when the user commands a focus evaluation or focussing operation to be performed, e.g., by partial depression of the camera release button, or the like, the emitted radiant-power level is progressively raised from zero or a low initial value. The system automatically selects an appropriate emitted-power level, in dependence upon automatically ascertained camera-to-subject distance, and the progressive increase in the level of emitted power terminates, without overshoot, when the automatically selected or steady-state power-level is reached. This assures that less, rather than more, power will be consumed in the course of the manually or automatically performed state-of-focus adjustment and, in systems where eye damage is to be considered, assures that low, not high, emitted-power levels will be established as the system adjusts itself towards the low steady-state power-level value appropriate for close-up situations.

A question which arises concerning implementation of the novel concept concerns how to generate the information concerning true camera-to-subject distance needed for the automatic control of the emitted radiant-power level. In some focussing systems, the system is designed to measure camera-to-subject distance per se, and to generate a distance-indicating signal per se indicative of this distance, with the subject-distance measurement being performed repeatedly. In such instances, the thusly developed distance-indicating signal in itself constitutes the information needed, and can be used to control the emitted-power level in the manner contemplated.

More problematic, however, and also more in need of the concept of the present invention, are those focussing systems which do not per se generate a distance-indicating signal, but instead generate signals indicating state-of-focus error, i.e., indicating whether the present subject-distance setting of the objective is shorter or longer than the true camera-to-subject distance. Typically, such error signals are digital in character, in the sense that they indicate the sense of the state-of-focus error without indicating per se amount of the state-of-focus error, so that a combination of such error signal and a present-distance-setting signal would not yield a true-subject-distance datum sufficient for automatic control of emitted power level.

In these problematic contexts, it is a concept of the present invention to derive the required information regarding camera-to-subject distance not by a separate distance-measuring system, but instead by relying upon the power level of the electrical signal produced by the system's receiving transducer. In general, if the true camera-to-subject distance is short, the power of the radiation incident upon the system's receiving transducer will be higher, and if the camera-to-subject distance is long the incident reflected power will be lower. Thus, although the derivation of the focus-control information actually used to adjust the camera's state of focus is in general independent of such distance-dependent variations in the power level of the reflected-back radiation incident on the receiving transducer, and indeed not reliable enough a distance indication to constitute the operating action of the focussing system itself, the information inherently contained in the received-back power level is more than adequate for automatic subject-distance-dependent control of the emitted power level. In the preferred embodiments described in detail below, it happens that the focus-control information generated by the system for automatic or semiautomatic control of the camera's state of focus is entirely digital in character, and therefore clearly independent of those variations in the power level of the reflected-back radiation attributable to the magnitude of the camera-to-subject distance. Nevertheless, even in a system so entirely digital as that, it is possible to abstract from the signal produced by the receiving transducer the information needed for automatic control of the emitted radiant-power level.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIGS. 1, 3 and 3a together depict a second exemplary embodiment of the invention.

DESCRIPTION OF PREFERRED EMBODIMENTS

Figure 1:
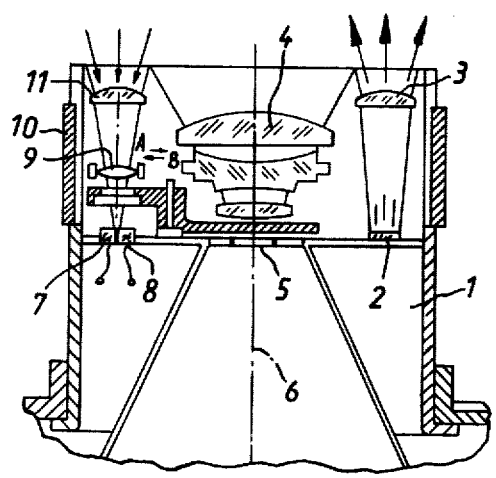
FIGS. 1, 2 and 2a together depict a first exemplary embodiment of the present invention.

In FIG. 1, numeral 1 denotes the tubular part of the housing of a still or motion-picture camera. Tubular housing part 1 accommodates the camera's optics, and also an infrared transmitting diode 2 whose emitted infrared radiation is concentrated by a convergent optics 3 and emitted from the camera towards the subject to be photographed. Numeral 4 denotes the camera's exposure objective, and numeral 5 denotes a fixed exposure aperture. Numeral 6 denotes the optical axis of the camera's exposure system.

Numerals 7 and 8 denote two infrared-responsive photodiodes located side by side behind an optics 9. Optics 9 shifts in the direction of arrow A or arrow B as the distance-setting or focus adjuster ring 10 of the camera is turned either clockwise or counterclockwise. A pulsed beam of infrared radiation emitted from the camera, as reflected from the subject back towards the camera, is collected by a convergent optics 11, transmitted through the shiftably mounted optics 9, and is incident upon one, or the other, or both, of the side-by-side infrared photodiodes 7, 8, in the form of a relatively tiny and highly concentrated spot of infrared light. Whether the tiny light spot is incident on one, or the other, or both, of photodiodes 7, 8 is determined by the shifted position of the optics 9, and accordingly by the angular setting of the distance-setting or focus adjuster ring 10. The mechanical coupling which converts the angular rotation of adjuster ring 10 into shifting of the optics 9 in the direction of arrow A or B is not shown, because mechanisms of the type very familiar in the art can be employed, for example, involving an annular cam whose inner peripheral surface acts as a cam furface and shares the rotation of adjuster ring 10, with a part of the mounting structure of optics 9 being pressed radially outwards by a biasing spring arrangement against such cam surface to act as a cam follower and in that way achieve shifting movement of optics 9 in the direction of radial arrows A, B as a function of the angular position of adjuster ring 10.

The angular position versus radial shift relationship of adjuster ring 10 and shiftable optics 9 is so designed that the illustrated system generates state-of-focus information, here in a digital manner. In particular, the angular position versus radial shift relationship is such that, if the subject-distance setting of adjuster ring 10 happens to coincide with the true camera-to-subject distance, the tiny light spot projected by optics 9 is incident upon both photodiodes 7, 8 equally. I.e., the photosensitive surfaces of the two photodiodes may be almost directly adjacent, so that in the equilibrium condition of this optical system half the tiny infrared light spot falls on one, and the other half on the other of the two photodiodes 7, 8. In contrast, if the subject-distance setting of the adjuster ring 10 is off from the true camera-to-subject distance by more than a predetermined amount, then the tiny light spot is incident more or exclusively on photodiode 7, or is incident more or exclusively on photodiode 8, depending upon whether the present subject-distance setting of adjuster ring 10 is shorter or longer than the true camera-to-subject distance. The combined irradiation states of the photodiodes accordingly constitute information indicating whether the present subject-distance setting is too long, too short, or within an acceptably small amount of the true camera-to-subject distance, the optical system illustrated in FIG. 1 essentially operating on the basis of trigonometric triangulation.

Figure 2:
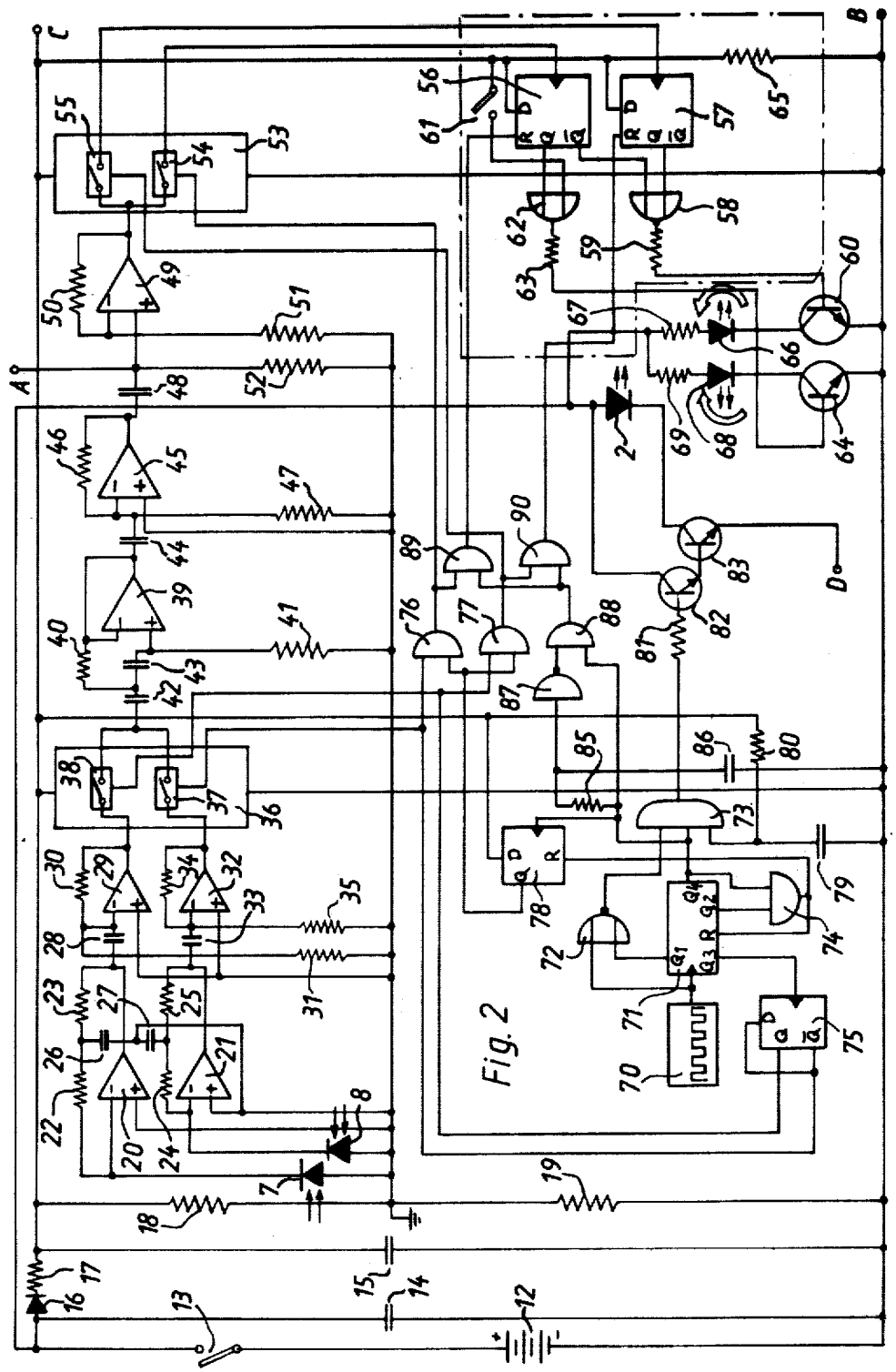
Figure 2A:
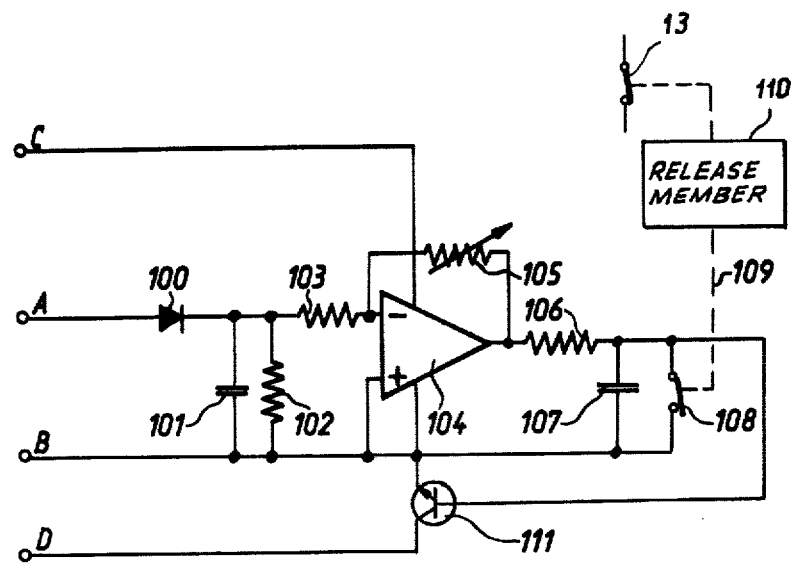

The infrared transmitter diode 2 and the two infrared-responsive receiver diodes 7, 8 are components of a focus-control circuit shown in detail in FIGS. 2 and 2a.

In FIG. 2, numeral 12 denotes a battery connectable to the illustrated signal-processing circuitry by means of a power-connect switch 13. Numerals 14 and 15 denote two capacitors employed to stabilize the operating voltage furnished to the illustrated circuitry, and numerals 16 and 17 denote a diode and a resistor likewise participating in this voltage stabilization. Two resistors 18, 19 of equal resistance value serve serve to define a ground potential midway within the range of stabilized operating voltage, this midway ground potential being employed as reference potential for certain parts of the illustrated circuitry.

The infrared-responsive photodiode 7 is connected to the inverting input of an operational amplifier 20, whose non-inverting input is connected to ground. The photodiode 8 is connected to the inverting input of an operational amplifier 21, whose non-inverting input is likewise connected to ground.

Each operational amplifier 20, 21 has a respective feedback branch comprising a respective pair of resistors 22, 23 and 24, 25. These pairs of resistors 22, 23 and 24, 25 serve to establish the D.C. signal gain of these amplifiers. The junctions between resistors 22 and 23, and between resistors 24 and 25, are connected to first terminals of respective capacitors 26, 27, whose second terminals are connected to ground. The presence of these two capacitors 26, 27 makes the A.C. signal gain of operational amplifiers 20, 21 frequency-dependent. With increasing frequency, the impedance of these capacitors decreases, and accordingly the A.C. signal gain of the amplifiers 20, 21 increases. Advantageously, the resistors 22 and 23 are of the same resistance values as resistors 24 and 25; the same applies to the two capacitors 26 and 27.

In the first signal-transmission path, there is connected to the output of operational amplifier 20 a coupling capacitor 28 connected to the inverting input of an operational amplifier 29, whose feedback branch comprises a resistor 30 which together with a further resistor 31 establishes the gain of operational amplifier 29. Operational amplifier 29 is, in the illustrated embodiment, an A.C. voltage amplifier.

Likewise, in the second signal-transmission path, the output of operational amplifier 21 is connected, via a coupling capacitor 33, to the inverting input of an operational amplifier 32. The feedback branch of operational amplifier 32 comprises a resistor 34 which together with a further resistor 35 establishes the gain of the amplifier.

Both signal-transmission paths feed into a first multiplexer 36 which comprises two switching stages 37, 38. The outputs of the two switching stages 37, 38 are connected in common to the input of a high-pass filter comprised of an operational amplifier 39, resistors 40 and 41, and capacitors 42 and 43. The high-pass filter 39-43 is so dimensioned that interference voltages having a frequency substantially equal to the local mains frequency, and equal to substantially twice the local mains frequency, will be suppressed; this prevents the system from reacting to nearby artificial lighting sources, powered off the local mains frequency, and flickering at or at twice the local mains frequency.

High-pass filter 39-43 is connected, via a coupling capacitor 44, to the input of an A.C. voltage amplifier comprised of an operational amplifier 45 and feedback resistors 46 and 47. The output of operational amplifier 45 is connected, via a coupling capacitor 48, to the input of a further operational amplifier 49, whose gain is established by two resistors 50 and 51. A resistor 52 is provided to discharge capacitor 48 when no signal is present. The right electrode of capacitor 48 is connected to a terminal A which, as shown in FIG. 2a, is connected to the anode of a diode 100, to whose cathode is connected a parallel circuit comprised of a smoothing capacitor 101 and a bleedoff resistor 102. The cathode of diode 100 is connected via a resistor 103 to the inverting input of an operational amplifier 104, whose gain is adjustable by means of an adjustable feedback resistor 105.

The non-inverting input of operational amplifier 104 is connected to a terminal B which, as shown in FIG. 2, is connected to the negative terminal of battery 12.

Operational amplifier 104 inverts the input signal which it receives, and its output is connected to the input of a time-delay stage comprised of a resistor 106 and a capacitor 107. Connected across capacitor 107 is a start switch 108. Start switch 108 is coupled, via a mechanical coupling 109, to a camera release member 110 which serves to activate both the start switch 108 and also the power-connect switch 13 of FIG. 2. The output terminal of time-delay stage 106, 107 is connected to the base of a transistor 111. The emitter of transistor 111 is connected, via terminal B, to the negative terminal of battery 12, and its collector is connected, via terminal D, to the emitter of a transistor 83 (FIG. 2) discussed below. In the illustrated embodiment, the transistor 111 is used as an electrically adjustable resistor.

The circuitry depicted in FIG. 2 furthermore includes a second multiplexer 53 comprised of two switching stages 54 and 55. The output of switching stage 54 is connected to the clock input of a D-flip-flop 56, and the output of switching stage 55 is connected to the clock input of a second D-flip-flop 57.

The D-inputs of both D-flip-flops 56, 57 are connected to the positive terminal of battery 12.

The Q-output of flip-flop 57 and the Q-output of flip-flop 56 are connected to respective inputs of an OR-gate 58, whose output is connected via a resistor 59 to the base of a transistor 60.

The Q-output of flip-flop 56 is connected to one input of an OR-gate 62. The other input of OR-gate 62 is connectable, via a switch 61, to the operating-voltage line C. Numeral 65 denotes a resistor connected between the right terminal of switch 61 and the negative terminal of battery 12. Switch 61 closes, and applies a "1" signal to OR-gate 62, when the focus adjuster ring 10 of FIG. 1 has been turned all the way to its maximum or infinity subject-distance setting. The output of OR-gate 62 is connected to the base of a transistor 64.

Connected in the collector circuit of transistor 60 is a light-emitting diode 66, connectable via a resistor 67 and the power-connect switch 13 to the positive terminal of battery 12. The collector circuit of transistor 64 contains a light-emitting diode 69 likewise connectable via a resistor 69 to the positive battery terminal. The two LED'S 66, 69 have light-emitting surfaces shaped as curved arrows, as indicated in FIG. 2, or are located behind apertures of such shape, and are located visible in the camera viewfinder. One of the other lights up, to directly indicate to the user the direction in which he should manually turn focus adjuster ring 10 to correct the camera's state of focus. When the state of focus is reasonably correct, this is indicated by simultaneous illumination of both LED's 66, 69. If the true camera-to-subject distance is such as to cause the system to instruct the user to turn adjuster ring 10 to its maximum subject-distance setting, switch 61 closes when maximum setting has been reached, and both LED's 66, 69 light up simultaneously, simulating a state of system equilibrium.

The circuitry shown in FIG. 2 furthermore comprises a central timer comprised of a pulse generator 70 and a counter 71. Counter 71 has a reset input R and four outputs Q1, Q2, Q3, Q4, and provides central timing action. For example, internally, counter 71 may be a ring or 1-out-of-n counter, with individual ones of the internal counter outputs and/or seccessive non-overlapping and/or overlapping groups of successive internal counter outputs connected to respective ones of the externally accessible outputs Q1-Q4. Thus, the first pulse from pulse generator 70 produces a "1" signal at output Q1, and this "1" signal may terminate upon the next pulse issued by pulse generator 70 or else, for example, not terminate until the fourth pulse issued by pulse generator 70. Likewise, a "1" signal appears on output Q2 after pulse generator 70 has issued a predetermined number of pulses and then terminates after a further predetermined number of pulses have been issued. In this way, the successive "1" signals produced on counter outputs Q1-Q4 can appear in succession at the required times and, where appropriate, overlap in duration.

The first output Q1 of counter 71 is connected to the lower input of a NOR-gate 72, whose upper input is connected to the output of pulse generator 70. The output of NOR-gate 72 is connected to the first input of an AND-gate 73, hereafter referred to as the transmitter gate. An enabling "1" signal is applied to this first input of transmitter gate 73 with the same rhythm with which pulses are issued by pulse generator 70, but not commencing until after the termination of the pulse produced at output Q1 of counter 71. The second input of transmitter gate 73 is connected to output Q4 of counter 74. The pulse phase of the "1" signal produced on output Q4 is shorter than that of the "1" signal produced on counter output Q3. Also, outputs Q2 and Q4 are connected to respective inputs of an AND-gate 74, whose output is connected to the reset input R of counter 71, the pulse phase of the pulses produced at counter outputs Q4 and Q2 being the same and used to reset counter 71 at the end of one cylce of operation.

Output Q3 of counter 71 is connected to the clock input of a D-flip-flop 75, whose D-input is connected to its Q-output. The Q-output of D-flip-flop 75 is connected to the control input of the switching stage 38 within first multiplexer 36, and its $\overline{Q}$-output is connected to the control input of switching stage 37 of the multiplexer. The connection of the D-input of flip-flop 75 to its $\overline{Q}$-output causes the "1" signal at one of the two flip-flop outputs to skip to the other output, in response to the positive flank of each pulse produced at output Q3 of counter 71. Thus, in response to the positive flank of one pulse at output Q3, the Q- and $\overline{Q}$ outputs of flip-flop 75 respectively carry a "1" signal and a "0" signal, then respectively carry a "0" signal and a "1" signal in response to the positive flank of the next Q3 pulse, and so forth. As a result, the two stitching stages 37, 38 internal to first multiplexer 36 assume conductive state alternately.

The $\overline{Q}$-output of flip-flop 75 is additionally connected to the upper input of an AND-gate 76, whereas its Q-output is additionally connected to the upper input of an AND-gate 77. The lower inputs of the two AND-gates 76, 77 are connected in common to the Q-output of a further D-flip flop 78, whose clock input is connected to output Q4 of counter 71. A "1" signal appears on the Q-output of flip-flop 78 in response to the positive flank of each pulse produced at counter output Q4. The reset input R of D-flip-flop 78 is connected to the output of AND-gate 74, as a result of which the "1" signal at the Q-output of flip-flop 78 reverts to a "0" signal at the end of each Q4 pulse. Accordingly, enabling "1" signals are applied to the lower inputs of the two AND-gates 76, 77 in synchronism with the pulses produced at output Q4 of counter 71.

The outputs of the two AND-gates 76, 77 are connected to the control inputs of respective ones of the two switching stages 54, 55 internal to second multiplexer 53. During the course of one operating cycle of counter 71, one or the other of the two switching stages 37, 38 of first multiplexer 36 is newly rendered conductive already at the leading flank of the Q3 pulse of counter 71, whereas the corresponding one of the two switching stages 54, 55 of second multiplexer 53 is not rendered conductive until the leading flank of the Q4 pulse from counter 71. As a result, the circuitry intermediate the two multiplexers 36, 53 has time enough to fully react to the signal to be transmitted (i.e., from photodiode 7 or else from photodiode 8) before the corresponding switching stage 54 or 55 within second multiplexer 53 actually becomes conductive for transmission of this signal to the corresponding output flip-flop 56 or 57. Likewise, the now conductive one of the two switching stages 37, 38 of first multiplexer 36 does not become non-conductive again, until after the corresponding one of the two switching stages 54, 55 of second multiplexer 53 has gone non-conductive, likewise to assure that the signal transmitted by second multiplexer 53 will be in a clean, fully developed and fully processed condition during its application to the relevant one of the two output flip-flops 56, 57.

The third (lowermost) input of transmitter gate 73 is connected to the output of a time-delay stage comprised of a capacitor 79 and a resistor 80. The time-constant of RC-stage 79, 80 is so selected that, after power-connect switch 13 closes, an enabling "1" signal will not become applied to this third input of transmitter gate 73 until after the elapse of a time interval long enough to assure that the newly switched-on oscillator 70 will reach and will stabilize at its designed frequency.

The output of transmitter gate 73 is connected via a resistor 81 to the base of a transistor 82, whose collector is connected to the positive terminal of battery 12, and whose emitter is connected to the base of a further transistor 83. The collector of transistor 83 is connected to the cathode of infrared-emitting transmitter diode 22, whose anode is connected to the positive battery terminal. The emitter of transistor 83 is connected, via terminal D, to the collector of transistor 111 (see FIG. 2a), whose emitter, as already stated, is connected via terminal B to the negative terminal of battery 12. Accordingly, the collector-emitter path of transistor 111 serves as an electrically adjustable emitter resistor for transistor 83, determining the collector current of transistor 83 and thereby the degree to which transmitter diode 2 is actually energized.

After power-connect switch 13 closes, and the start-up time-delay interval elapses, a "1" signal is thereafter uninterruptedly applied to the third (lowermost) input of transmitter gate 73. The second input of transmitter gate 73 receives a "1" signal identical to the "1" signal produced at output Q4 of central timing counter 71, i.e., near the end of the cycle of operation of counter 71. The "1" signal applied to the first input of transmitter gate 73, serving to actually initiate the infrared emission, is furnished from the output of NOR-gate 72 and begins, after the start of the Q4 pulse, as soon as the then present pulse at the output of oscillator 70 terminates. Transmitting diode 2 now begins to be energized.

Output Q4 of counter 71 is furthermore connected, via a time-delay stage comprised of a resistor 85 and a capacitor 86, and via an inverter 87, to the upper input of an AND-gate 88, whose lower input is connected to the selfsame counter output Q4, but directly. The output of AND-gate 88 is connected to the lower inputs of two AND-gates 89, 90, whose upper inputs are connected to the outputs of respective ones of the two AND-gates 76, 77. The output of AND-gate 89 is connected to the reset input R of first D-flip-flop 56, and the output of AND-gate 90 to the reset input R of second D-flip-flop 57. A "1" signal appears alternately on the output of one and then, during the next operating cycle of counter 71, the other of the two AND-gates 89, 90. During one operating cycle of counter 71, first multiplexer 36 transmits the output signal of photodiode 7, and second multiplexer 53 transmits the processed version of this signal to output flip-flop 57, permanently associated with photodiode 7; during the next operating cycle of counter 71, first multiplexer 36 transmits the output signal of photodiode 8, and second multiplexer 53 transmits the processed version of this signal to output flip-flop 56, permanently associated with photodiode 8. The "1" signal appearing at the output of one or the other of AND-gates 89, 90 during any single operating cycle of counter 71 serves to reset the one of the two flip-flops 56, 57 associated with the one of the two second-multiplexer switching stages 54, 55 just rendered conductive. The duration of the reset pulse applied to one or the other of the two flip-flops 56, 57 is determined by the length of the delay interval introduced by time-delay stage 85, 86. As already indicated, the two second-multiplexer switching stages 54, 55 are rendered conductive alternately, during alternate cycles of operation of counter 71, and each time for a duration equal to the duration of the Q4 pulse produced by counter 71, the resetting of one or the other of the two flip-flops 56, 57, just explained, occurring right at the start of the Q4 pulse. In this way, the datum stored by each flip-flop 56, 57 is kept stored for as long as possible, i.e., being erased only at the moment when a new datum (or the previous datum, repeated) is ready to be applied to the flip-flop.

If the present setting of focus adjuster ring 10 is longer or shorter than the true camera-to-subject distance, by more than acceptable amount, the tiny infrared light spot is incident on only one of the two photodiodes 7, 8, and as a result only one of the two output flip-flops 56, 57 carries a "1" signal on its Q-output, causing the associated one of the two LED's 66, 69 to be illuminated, this informing the user of the direction in which he should turn adjuster ring 10 to correct the camera's state of focus. When the state of focus has been properly adjusted, the tiny infrared light spot is equally incident upon both photodiodes 7, 8, and both LED's 66, 69 are in illuminated state, to indicate to the user that the camera's state of focus does not require further adjustment. If the focus adjuster ring 10 has been brought all the way to maximum (infinity) subject-distance setting, but despite this the tiny infrared light spot has not been shifted onto both photodiodes 7, 8 equally due to a still larger value of the true camera-to-subject distance, the system cannot actually achieve an equilibrium condition. However, to simulate an equilibrium condition, switch 61 closes when the maximum subject-distance setting has been reached, simulating the appearance of a "1" signal at the Q-output of flip-flop 56, as a result of which both LED's 66, 69 will be in illuminated state.

To start circuit operation, the user partially depresses the camera release member 110 (FIG. 2a), or else flips a separately provided external switch, to close power-connect switch 13 (FIG. 2) and to open start switch 108 (FIG. 2b). The collector-emitter resistance of transistor 111 determines the magnitude of the energizing current which can flow through infrared-emissive transmitter diode 2, and the collector-emitter voltage of transistor 110 is determined by its base-emitter voltage, which, in FIG. 2b, is equal to the voltage across capacitor 107. When start switch 108 first opens, capacitor 107 is initially uncharged, transistor 111 initially non-conductive, and therefore initially no energizing current at all can flow through transmitter diode 2. As the voltage across capacitor 107 begins to build-up, transistor 111 becomes conductive, and therefore energizing current can now flow through transmitter diode 2. However, because the collector-emitter resistance of transistor 111 is still high, the energizing current flowing through transmitter diode 2 is initially low, and progressively builds up as the voltage across capacitor 107 increases and the collector-emitter resistance of transistor 111 decreases.

With energizing current of increasing magnitude flowing through transmitter diode 2 during its successive intervals of energization, one or the other or both of receiver photodiodes 7, 8 furnish signals of increasing strength and processability, with the result that the processed signal produced at terminal A in FIG. 2 progressively builds up in strength. Although in FIG. 2 the signal produced at terminal A is used only for a digital control action, namely to establish the states of the two output flip-flops 56, 57, it necessarily has a magnitude dependent upon camera-to-subject distance, due to the nature of the signal-processing circuitry connected to the outputs of the two receiver photodiodes 7, 8 in FIG. 2. The distance-dependent magnitude of the signal developed at terminal A is exploited in the circuitry of FIG. 2a for negative-feedback regulation of the intensity of the emitted infrared radiation in dependence upon true camera-to-subject distance.

In particular, the signal at A in FIG. 2a is applied to the inverting input of operational amplifier 104, with the result that the potential at the output of amplifier 104, although always positive, decreases as the strength of the signal at A increases. Thus, the voltage to which capacitor 107 charges will be inversely related to the strength of the signal at A, and therefore will in general be higher for longer values of the true camera-to-subject distance, and lower for shorter values of the true camera-to-subject distance. Accordingly, when the circuit shown in FIG. 2a has achieved a steady state, the intensity of the infrared radiation emitted from the camera will be low when the true camera-to-subject distance is short, and will be high when the true camera-to-subject distance is great.

This has several important results. Most importantly, if the subject at which the focussing system is aimed is a human subject located close to the camera, the intensity of any infrared radiation happening to reach the eyes of the human subject will be kept at a low value, lower than any value posing a threat of eye damage or discomfort. Secondly, in terms of energy efficiency, if the true camera-to-subject distance is short, the system will not emit infrared radiation at a wasteful power level in excess of what is needed for the development of well-defined and processable signals by the two receiver photodiodes 7, 8. Likewise, if the true camera-to-subject distance is long, the system automatically increases the intensity of the emitted infrared radiation up to a level assuring the development of processable signals by the two receiver photodiodes 7, 8. Similarly, for short values of the camera-to-subject distance, the intensity of the signal will not be so great as to pose a threat of damage to the photodiodes or create a situation in which the signal-processing circuitry connected to the outputs of the two photodiodes 7, 8 will be overdriven out of the operating range of such signal-processing circuitry; or expressed in other words, no special design countermeasures need be taken to protect the photodiodes against overloading or to impart to the signal-processing circuitry a very large operating range such as could inherently increase the cost of the signal-processing circuitry.

In the presently preferred circuit configuration shown in FIG. 2a, the use of the time-delay stage 106, 107 is particularly advantageous, because of the action which it introduces as the circuit of FIG. 2a adjusts itself towards a steady state upon closing of power-connect switch 13. In particular, if the focussing system is aimed at a close subject when power-connect switch 13 is first closed, the intensity of the emitted infrared radiation will progressively increase from a low value towards higher values, with this progressive increase terminating when the intensity value appropriate for the distance involved is reached, i.e., in contrast to an initial overshoot of the low intensity value actually required followed by an automatic downwards adjustment towards the required low intensity value.

Figure 3A:
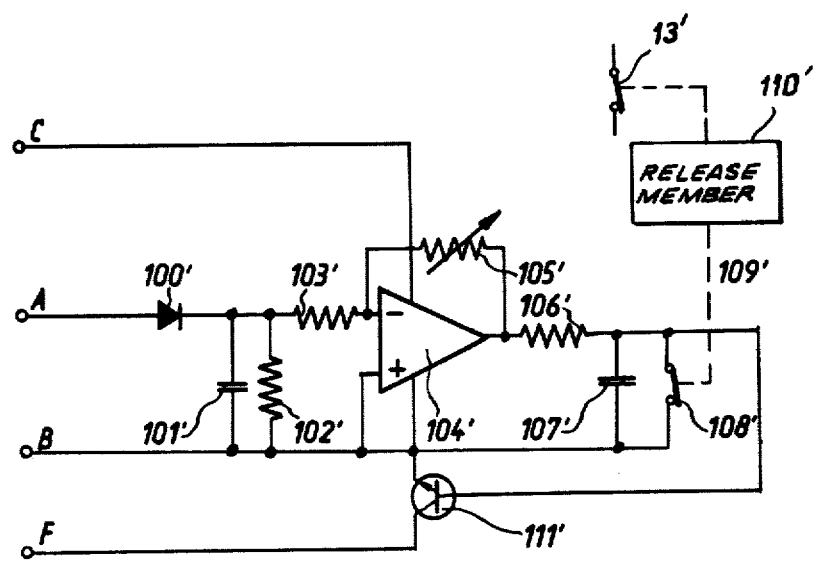
Figure 3:
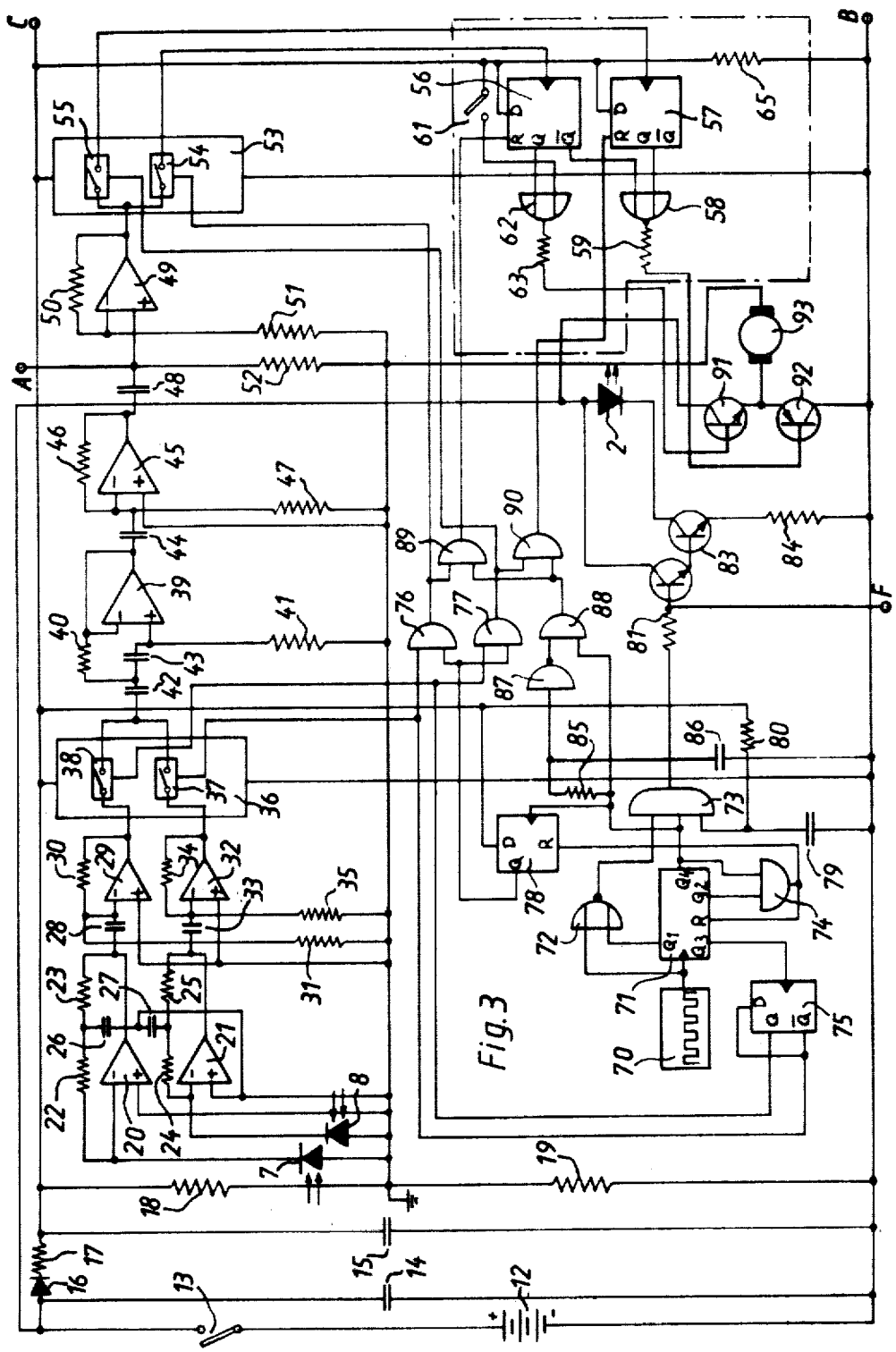

FIGS. 1, 3 and 3a together depict a second embodiment of the invention, in which focussing is fully automatic without user participation, involving the use of an adjusting motor.

Components in FIG. 3 corresponding to those of FIG. 2 are denoted by the same reference numerals and characters as there. In FIG. 3, the outputs of OR-gate 62 and NOR-gate 58 are connected to the bases of respective ones of a pnp transistor 91 and an npn transistor 92, whose collector-emitter paths are connected in series across the battery 12. The junction between the emitters of the two transistors 91, 92 is connected to the left terminal of a D.C. adjusting motor 93, for push-pull motor energization, the right terminal of motor 93 being connected to ground, i.e., to the midway potential established by the two equal-value resistors 18, 19. When the camera's state of the focus is off, the tiny infrared light spot is incident upon only one of the two photodiodes 7, 8, and one or the other of transistors 91, 92 is energized, resulting in current flow through adjusting motor 93 in one or the other direction. When system equilibrium has been achieved, the light spot is incident on both photo diodes 7, 8, and the energization of motor 93 terminates.

The radiation intensity regulating circuit of FIG. 3a is of the same configuration as that of FIG. 2a, and corresponding components are denoted by the same reference numerals and characters as in FIG. 2a, but primed. However, in this second embodiment, the collector of transistor 111' is not connected to the emitter of transistor 83 but instead, via a terminal F, to the base of transistor 81, and transistor 83 is provided with a simple emitter resistor 84. The operation of the circuit is the same as already described.

It will be understood that each of the elements described above, or two or more together, may also find a useful application in other types of circuits and constructions differing from the types described above.

While the invention has been illustrated and described as embodied in a focussing system emitting infrared radiation and ascertaining camera-to-subject distance on the basis of a particular version of trigonometric triangulation, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In the focussing system of a photographic camera having exposure optics of adjustable subject-distance setting, in combination, means emitting radiation from the camera towards a subject to be photographed, receiving the radiation reflected back from the subject to the camera, and developing from the reflected back radiation a signal dependent upon the true camera-to-subject distance; and means operative for automatically controlling the power of the emitted radiation in dependence upon said signal.

2. In a focussing system as defined in claim 1, the first mentioned means including transducer means receiving the reflected-back radiation and generating an electrical signal whose power inherently depends upon the distance the emitted radiation travels in going from the camera to the subject and back to the camera, the controlling means comprising means operative for automatically controlling the power of the emitted radiation in dependence upon the power of the electrical signal generated by the transducer means.

3. In a focussing system as defined in claim 1, the controlling means comprising means operative for limiting the power of the radiation emitted from the camera when the value of said signal indicates a relatively low camera-to-subject distance but not similarly limiting the power of the radiation emitted from the camera when the value of said signal indicates a relatively high camera-to-subject distance.

4. In a focussing system as defined in claim 1, the controlling means comprising means operative for adjusting the power of the radiation emitted from the camera in direct relationship to the camera-to-subject distance indicated by the value of said signal.

5. In a focussing system as defined in claim 1, the first mentioned means including transducer means receiving the reflected-back radiation and generating an electrical signal whose power inherently depends upon the distance which the emitted radiation travels in going from the camera to the subject and back to the camera, and means operative for deriving from the electrical signal generated by the transducer means but independently of the inherently distance-dependent power of said electrical signal focus information dependent upon the true camera-to-subject distance, the controlling means comprising means controlling the power of the radiation emitted from the camera independently of said derived focus information and in dependence upon the power of the electrical signal generated by the transducer means.

6. In a focussing system as defined in claim 1, the first mentioned means including transmitting transducer means operative for emitting said radiation when electrically energized, the controlling means including controllable impedance means connected in circuit with the transmitting transducer means and having a variable impedance determining the degree of electrical energization of the transmitting transducer means, and means automatically controlling the impedance of the controllable impedance means in dependence upon said signal.

7. In a focussing system as defined in claim 1, the first mentioned means including transmitting transducer means operative for emitting pulsed radiation when electrically energized, receiving transducer means receiving the reflected-back pulsed radiation and generating an electrical signal including an A.C. signal component and having a power which inherently depends upon the distance travelled by the emitted radiation in going from the camera to the subject and back to the camera, signal-processing means receiving the electrical signal produced by the receiving transducer means and including A.C. amplifier circuitry for amplifying the A.C. signal component, and evaluating means operative for deriving from the amplified A.C. signal component digital signals constituting focus information, the controlling means including a controllable-impedance semiconductor element connected in circuit with the transmitting transducer means and having a variable impedance determining the degree of electrical energization of the transmitting transducer means, and means for controlling the impedance of the controllable-impedance element in dependence upon the amplitude of the amplified A.C. signal component including a rectifier connected to the output of the A.C. amplifying circuitry, an amplifier connected to the output of the rectifier, and means connected to the output of the amplifier and operative for applying to the controllable-impedance element a control signal causing the impedance of the element to vary the degree of energization of the transmitting transducer means in inverse relationship to the power of the amplified A.C. signal component.

8. In a focussing system as defined in claim 7, the means applying a control signal to the controllable impedance means including a time-delay stage connected between the output of the amplifier and the controllable element, and start-switch means connected to the time-delay stage and operative when activated for causing the time-delay stage to progressively change the impedance of the controllable-impedance element in a sense progressively increasing the degree of energization of the transmitting transducer means.

9. In a focussing system as defined in claim 8, the time-delay stage having a time-constant of such value that upon activation of the start-switch means the degree of energization of the transmitting transducer means progressively increases towards a steady value inherently determined by the true camera-to-subject distance without overshooting the steady value.

10. In a focussing system as defined in claim 8, the system including a power source and power-connect switch means connecting the power source to the remainder of the system, the power-connect switch means and the start-switch means being coupled together for simultaneous activation.

11. In a focussing system as defined in claim 1, the first mentioned means including transducer means receiving the reflected-back radiation and generating an electrical signal whose power inherently depends upon the distance which the emitted radiation travels in going from the camera to the subject and back to the camera, the controlling means comprising means operative for automatically selecting an emitted-power level to be established for the radiation emitted from the camera in inverse relationship to the power of the electrical signal produced by the transducer means, start-switch means activatable by the user when the focussing system is to become operative, and means responding to activation of the start-switch means by causing the power of the radiation emitted from the camera to progressively increase to the automatically selected emitted-power level.

* * * * *